(12) United States Patent
Asakura

(10) Patent No.: US 7,394,917 B2
(45) Date of Patent: Jul. 1, 2008

(54) APPARATUS FOR MEASURING A TRAJECTORY

(75) Inventor: Takeshi Asakura, Kobe (JP)

(73) Assignee: SRI Sports Limited, Kobe (JP)

( * ) Notice: Subject to any disclaimer, the term of this patent is extended or adjusted under 35 U.S.C. 154(b) by 613 days.

(21) Appl. No.: 10/872,490

(22) Filed: Jun. 22, 2004

(65) Prior Publication Data

US 2005/0041838 A1    Feb. 24, 2005

(30) Foreign Application Priority Data

Aug. 19, 2003    (JP) .............................. 2003-294924

(51) Int. Cl.
*G06K 9/00*    (2006.01)
(52) U.S. Cl. .................. 382/107; 382/291; 473/407
(58) Field of Classification Search ................ 382/103, 382/106, 107, 122, 123, 154, 168, 181, 232, 382/274, 286, 291–299, 312, 318, 100, 173, 382/178, 203, 254, 282; 473/198, 199, 141, 473/407; 434/252
See application file for complete search history.

(56) References Cited

U.S. PATENT DOCUMENTS 5,938,545 A * 8/1999 Cooper et al. ................ 473/407

| | | | | |
|---|---|---|---|---|
| 6,042,483 A | * | 3/2000 | Katayama | 473/199 |
| 6,514,081 B1 | * | 2/2003 | Mengoli | 434/252 |
| 6,579,190 B2 | * | 6/2003 | Yamamoto | 473/141 |
| 6,592,465 B2 | * | 7/2003 | Lutz et al. | 473/198 |

FOREIGN PATENT DOCUMENTS

| | | |
|---|---|---|
| JP | 6-323852 A | 11/1994 |
| JP | 2001-145718 A | 5/2001 |
| JP | 2003-42716 A | 2/2003 |

* cited by examiner

*Primary Examiner*—Seyed Azarian
(74) *Attorney, Agent, or Firm*—Birch, Stewart, Kolasch & Birch, LLP

(57) ABSTRACT

An apparatus comprises a first camera (1), a second camera (2) and a third camera (3). The first camera (1) photographs a golf ball (B) from behind, the second camera (2) photographs the golf ball (B) from a head, and the third camera (3) photographs the golf ball (B) obliquely from ahead. At an early stage, position coordinates (x, z) of the golf ball (B) are calculated by a triangulation method from an angle of elevation of the golf ball (B) which is obtained by the first camera (1) and an angle of elevation of the golf ball (B) which is obtained by the second camera (2). Within a range in which the direction of advance of the golf ball (B) is coincident with the optical axis of the second camera (2), the position coordinates (x, z) of the golf ball (B) are calculated by the triangulation method from the angle of elevation of the golf ball (B) which is obtained by the first camera (1) and an angle of view of the golf ball (B) which is obtained by the third camera (3).

8 Claims, 6 Drawing Sheets

APPARATUS FOR MEASURING A TRAJECTORY

This application claims priority on Patent Application No. 2003-294924 filed in JAPAN on Aug. 19, 2003.

BACKGROUND OF THE INVENTION

1. Field of the Invention

The present invention relates to an apparatus for measuring a trajectory of a flying ball.

2. Description of the Related Art

A golf ball flies by hitting with a golf club. If the trajectory of the golf ball is measured, it is useful for the performance evaluation of the golf ball, the performance evaluation of a golf club and the diagnosis of a swing form of a golf player.

Japanese Laid-Open Patent Publication No. 6-323852 has disclosed a measuring apparatus using a CCD camera having a shutter function. In this apparatus, image data photographed by the CCD camera are taken into a calculating portion and a change between image frames is written to a multilayer memory by an image processing. The trajectory of the golf ball is measured from a multilayered image thus obtained. In the measuring apparatus, the trajectory of the golf ball can be observed but time series data on the position coordinates of the golf ball cannot be measured.

Japanese Laid-Open Patent Publication No. 2001-145718 has disclosed an apparatus for measuring the trajectory of a golf ball based on image data obtained by a CCD camera provided behind a launch point and image data obtained by a CCD camera provided on the side of the trajectory (a perpendicular direction to a flight direction). In this apparatus, a large number of CCD cameras are to be provided on the side. In addition, in order to measure the trajectory by the apparatus with high precision, it is necessary to sufficiently increase a distance between the CCD camera provided on the side and the golf ball. In a general golf course or a testing field for a golf article manufacturer, a distance in a hitting direction is long and a side space is small. There are many restrictions on the installation of the apparatus.

Japanese Laid-Open Patent Publication No. 2003-42716 has disclosed an apparatus comprising a CCD camera for photographing a flying ball from behind and a CCD camera for photographing the ball from ahead and serving to calculate the coordinates of the ball by the calculus of finite differences based on images obtained by these cameras. In the calculus of finite differences, a difference peak hold processing is carried out in order of frames for image data obtained by the CCD camera. More specifically, a pixel memory having a great change from a previous frame is held in a certain frame. Since a flying ball moves within an angle of view, the difference peak hold processing can be carried out.

If the direction of the movement of the ball is coincident with the direction of the optical axis of the camera in the calculus of finite differences, the position of the ball in a certain frame is coincident with the position of the ball in a next frame. In this case, the difference peak hold processing cannot be carried out. In the measuring method, a part of a trajectory is not measured in some cases.

It is an object of the present invention to provide an apparatus capable of measuring time series data on the position coordinates of a flying ball with high precision.

SUMMARY OF THE INVENTION

A ball trajectory measuring apparatus according to the present invention comprises:

a first camera for photographing a flying ball from behind;

a second camera for photographing the ball from ahead;

a third camera which is present in a position placed apart from a segment connecting the first camera to the second camera; and a calculating portion for calculating time series data on position coordinates of the ball based on a comparison between an image obtained by the first camera and an image obtained by the second camera and a comparison between the image obtained by the first camera and an image obtained by the third camera.

Another ball trajectory measuring apparatus according to the present invention comprises:

a first camera for photographing a flying ball from behind;

a second camera for photographing the ball from ahead;

a third camera which is present in a position placed apart from a segment connecting the first camera to the second camera; and a calculating portion for calculating time series data on position coordinates of the ball based on a comparison between an image obtained by the first camera and an image obtained by the second camera and a comparison between an image obtained by the third camera and the image obtained by the second camera.

It is preferable that a part of an angle of view of the first camera or the second camera and a part of an angle of view of the third camera should overlap with each other. The angle of view of the third camera is related to the angle of view of the first camera or the second camera based on a ball image obtained by the first camera or the second camera and a ball image obtained by the third camera.

In the present invention, a range which cannot be subjected to a difference peak hold processing in the photographing operation of the first camera or the second camera is photographed by the third camera. The third camera complements the first camera or the second camera so that a trajectory can be measured within a wide range with high precision.

DESCRIPTION OF THE PREFERRED EMBODIMENTS

The present invention will be described below in detail based on a preferred embodiment with reference to the drawings.

Figure 1:
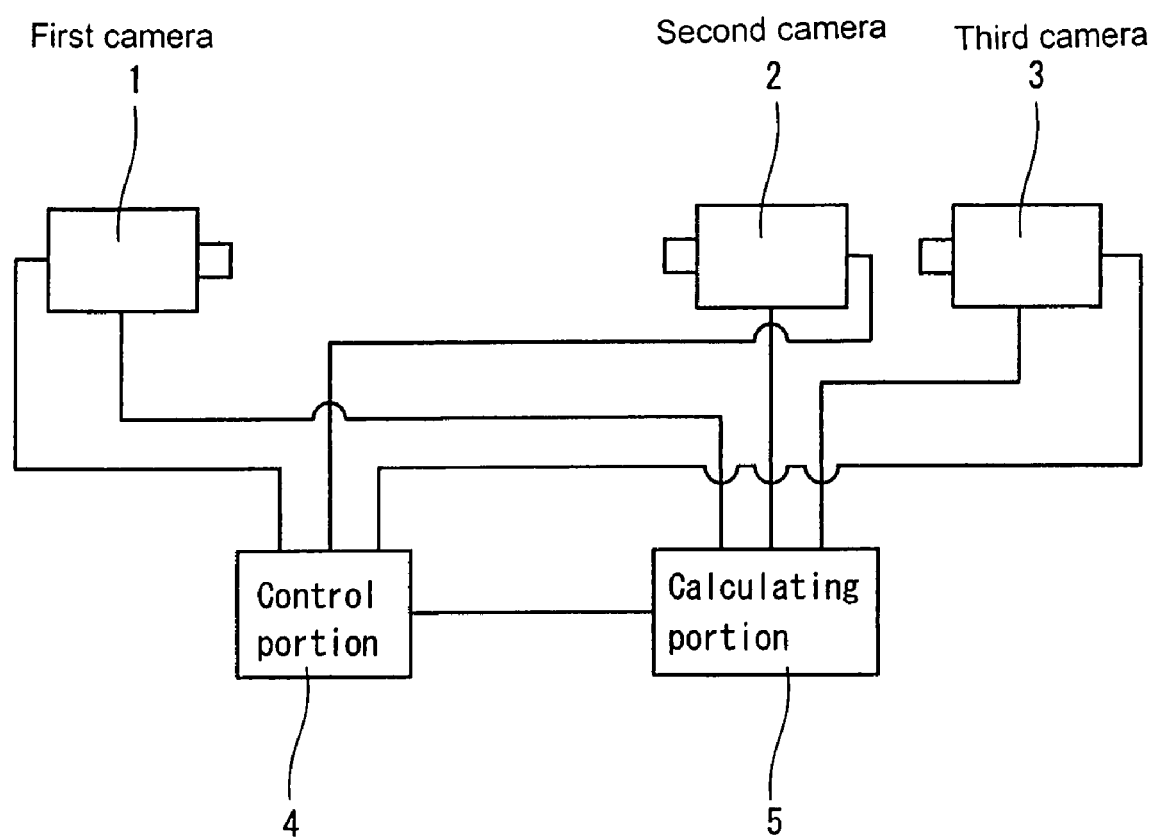
FIG. 1 is a view showing the schematic structure of a ball trajectory measuring apparatus according to an embodiment of the present invention.

An apparatus shown in FIG. 1 comprises a first camera 1, a second camera 2, a third camera 3, a control portion 4 and a calculating portion 5. The first camera 1, the second camera 2 and the third camera 3 are CCD cameras having a shutter function. The control portion 4 and the calculating portion 5 include computers and peripheral apparatuses. The control portion 4 and the calculating portion 5 may be constituted by the same computer. A ball trajectory measuring apparatus may comprise a printing portion, a display portion and the like which are not shown.

The control portion 4 detects a trigger signal generated by hitting a golf ball and then transmits a signal to start to record image data to the calculating portion 5. Moreover, the control portion 4 transmits a synchronizing signal toward the first camera 1, the second camera 2 and the third camera 3. A plurality of synchronous images is obtained by the first camera 1, the second camera 2 and the third camera 3 which receive the synchronizing signal.

The calculating portion 5 records image data obtained by the first camera 1, the second camera 2 and the third camera 3 for each frame. A time plus VTR, a digital disk recorder, an animation board and the like can be used for the recording operation. The data thus obtained are subjected to an image processing. In the image processing, a difference peak hold processing is carried out in order of frames for the image data. More specifically, a pixel memory having a great change from a previous frame in the pixels of a certain frame is held. The image of the golf ball is whiter than a background and becomes the whitest portion by a shade decision. Therefore, the background is erased by the image processing so that frame data having only the image of the golf ball can be obtained.

Figure 2:
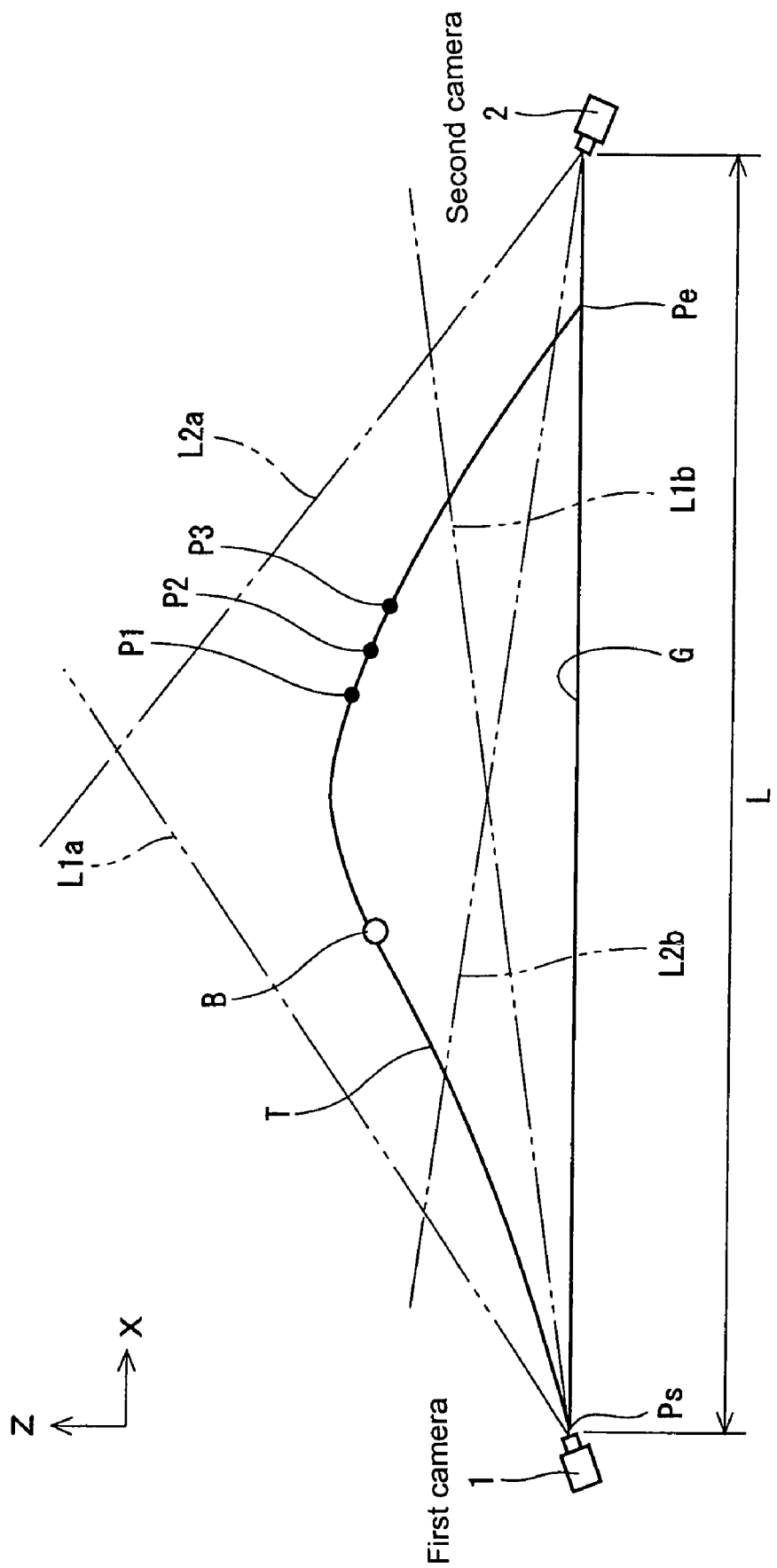
FIG. 2 is a typical side view showing a state in which the trajectory of a golf ball is measured by the apparatus of FIG. 1.
Figure 3:
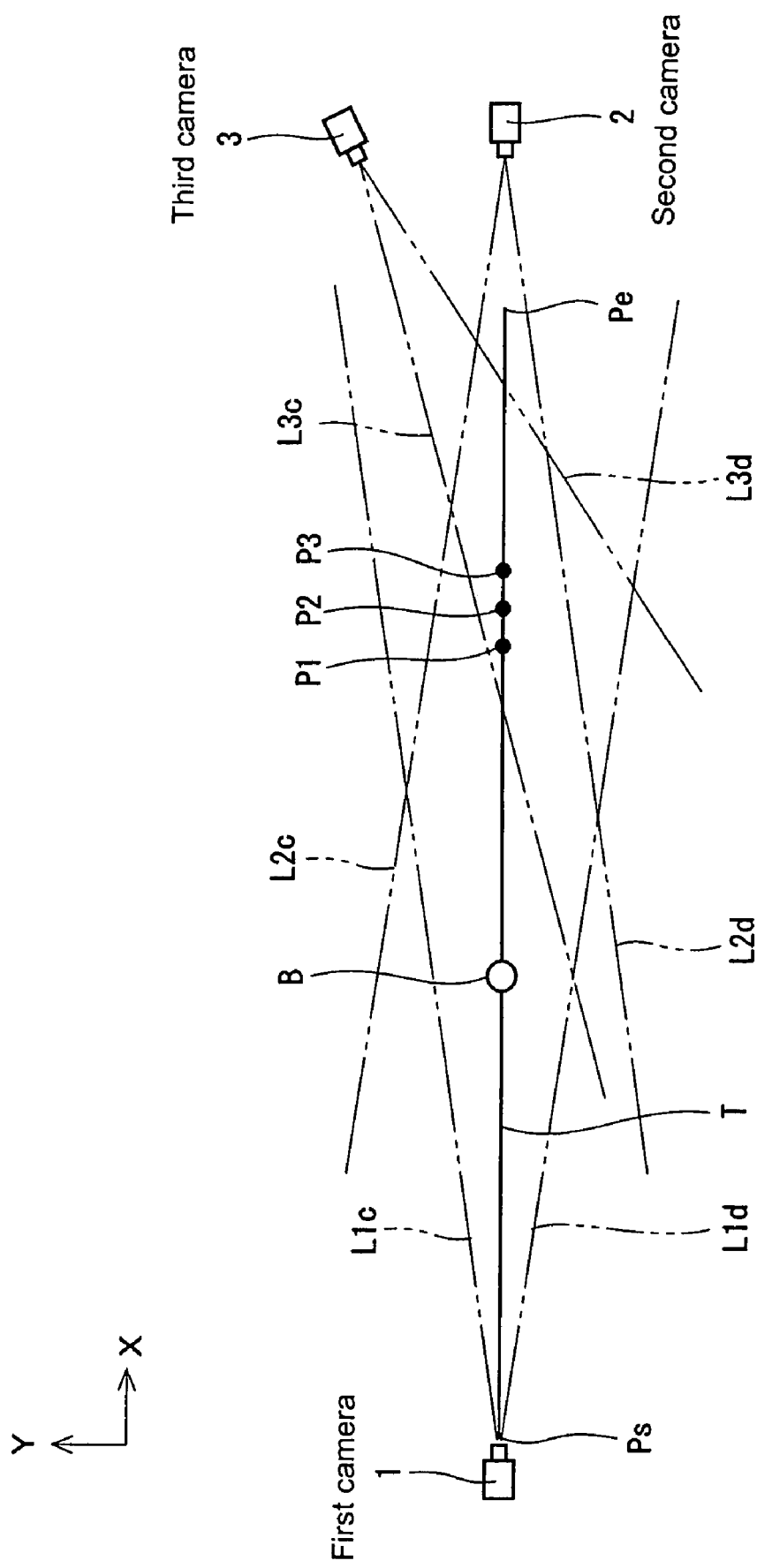
FIG. 3 is a typical plan view showing the state in which the trajectory of the golf ball is measured by the apparatus of FIG. 1.

FIG. 2 is a typical side view showing a state in which the trajectory of the golf ball is measured by the apparatus of FIG. 1, and FIG. 3 is a typical plan view showing the same state. These drawings show a golf ball B and a trajectory T of the golf ball B. The golf ball B flies from left toward right in FIGS. 2 and 3. In FIGS. 2 and 3, Ps denotes a launch point and Pe denotes a drop point.

The first camera 1, the second camera 2 and the third camera 3 are put on a horizontal ground G. The first camera 1, the second camera 2 and the third camera 3 are provided in such a manner that optical axes thereof are inclined upward with respect to a horizontal direction. The first camera 1 is positioned slightly behind the launch point Ps. The first camera 1 photographs the golf ball B from behind. The second camera 2 is positioned ahead of the drop point Pe. The second camera 2 photographs the golf ball B from ahead. The third camera 3 is positioned obliquely ahead of the drop point Pe. The third camera 3 photographs the golf ball B obliquely from ahead.

In FIG. 2, an angle of view in a vertical direction of the first camera 1 is surrounded by two-dotted chain lines L1*a* and L1*b*. An angle of view in a vertical direction of the second camera 2 is surrounded by two-dotted chain lines L2*a* and L2*b*. In FIG. 3, an angle of view in a horizontal direction of the first camera 1 is surrounded by two-dotted chain lines L1*c* and L1*d*. An angle of view in a horizontal direction of the second camera 2 is surrounded by two-dotted chain lines L2*c* and L2*d*. An angle of view in a horizontal direction of the third camera 3 is surrounded by two-dotted chain lines L3*c* and L3*d*.

As shown in FIG. 2, there are supposed two-dimensional position coordinates in which the position of the first camera 1 is set to be an origin, a straight line passing through the first camera 1 and the second camera 2 is set to be an X axis, and a vertical direction is set to be a Z-axis. A distance between the first camera 1 and the second camera 2 is represented by L. The position coordinates of the first camera 1 are (0, 0) and the position coordinates of the second camera 2 are (L, 0).

Description will be given to a method of calculating position coordinates (x, z) of the golf ball B by a triangulation method. When the golf ball B is launched, it is first photographed by the first camera 1 and the second camera 2. By the photographing operation, image data are obtained. Image data obtained by the first camera 1 and image data obtained by the second camera 2 make a pair. A black-and-white decision is carried out by horizontal scanning for frame data obtained by the first camera 1, and upper and lower positions on the image of the ball are detected. Based on the result of the detection, and the direction of an optical axis of the first camera 1 and an angle of view thereof, an angle of elevation $\theta_1$ of the golf ball B in the position of the first camera 1 is calculated. Similarly, the black-and-white decision is carried out by the horizontal scanning for frame data obtained by the second camera 2, and upper and lower positions on the image of the ball are detected. Based on the result of the detection, and the direction of an optical axis of the second camera 2 and an angle of view thereof, an angle of elevation $\theta_2$ of the golf ball B in the position of the second camera 2 is calculated.

The following equation (1) is obtained by a triangle setting, as vertexes, a foot Pf of a perpendicular line brought down from the golf ball B, the first camera 1 and the golf ball B.

$$\tan \theta_1 = z/x \quad (1)$$

On the other hand, the following equation (2) is obtained by a triangle setting, as vertexes, the foot Pf of the perpendicular line brought down from the golf ball B, the second camera 2 and the golf ball B.

$$\tan \theta_2 = z/(L-x) \quad (2)$$

The following equations (3) and (4) are led from the equations (1) and (2).

$$x = (L \cdot \tan \theta_2)/(\tan \theta_1 + \tan \theta_2) \quad (3)$$

$$z = (L \cdot \tan \theta_1 \cdot \tan \theta_2)/(\tan \theta_1 + \tan \theta_2) \quad (4)$$

A distance L between the first camera 1 and the third camera 3 and the angles $\theta_1$ and $\theta_2$ of elevation which are calculated are substituted for the equations (3) and (4), and the position coordinates (x, z) of the golf ball B are calculated. The position coordinates (x, z) are obtained as time series data with the flight of the golf ball B.

All of points P1, P2 and P3 shown in FIGS. 2 and 3 are positioned on the trajectory T. A straight line connecting these three points is almost coincident with the optical axis of the second camera 2.

Figure 4:
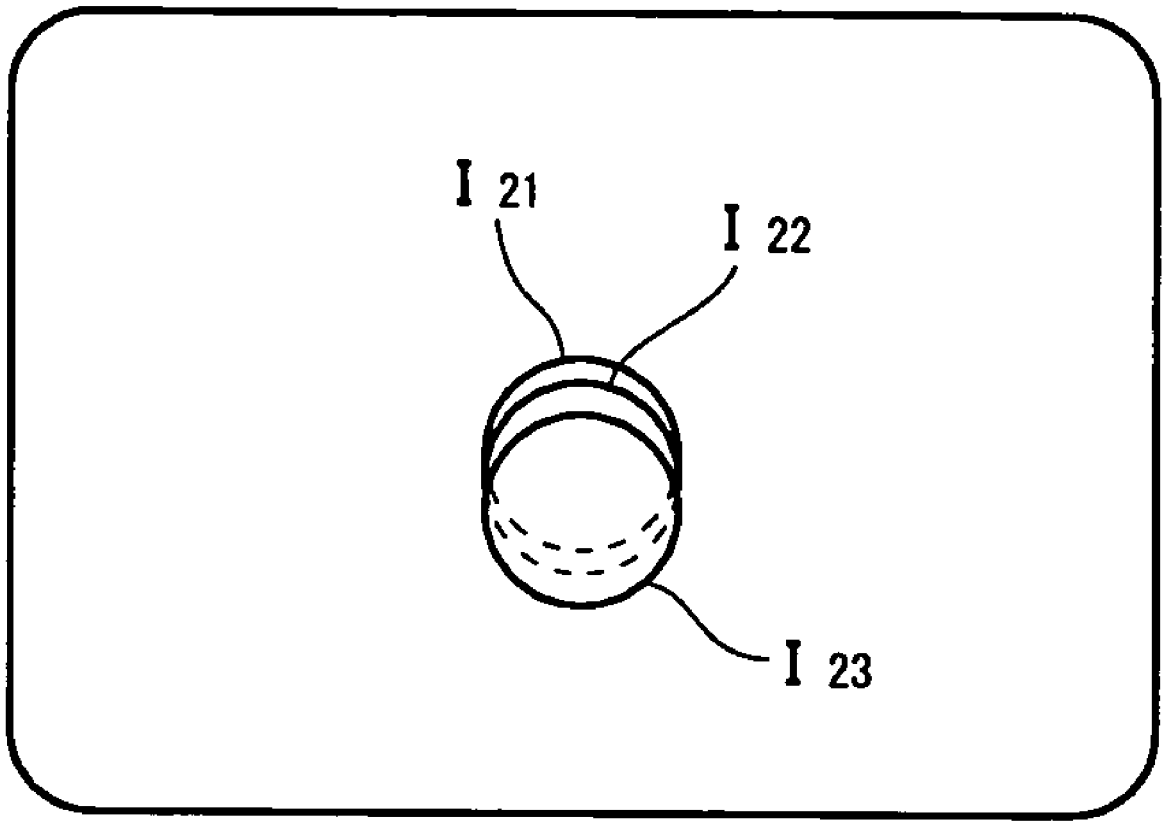
FIG. 4 is a typical view showing a state in which three frames obtained by a second camera are superposed.

FIG. 4 is a typical view showing a state in which three frames obtained by the second camera 2 are superposed. FIG. 4 shows a ball image $I_{21}$ on the point P1, a ball image $I_{22}$ on the point P2, and a ball image $I_{23}$ on the point P3. Since the straight line connecting the points P1, P2 and P3 is almost coincident with the optical axis of the second camera 2 as described above, the ball images $I_{21}$, $I_{22}$ and $I_{23}$ are almost superposed. The ball images $I_{21}$ and $I_{22}$ are superposed on each other. Therefore, a difference peak hold processing cannot be carried out between the frame of the ball image $I_{21}$ and that of the ball image $I_{22}$. Similarly, the ball images $I_{22}$ and $I_{23}$ are superposed on each other. Therefore, the difference peak hold processing cannot be carried out between the frame of the ball image $I_{22}$ and that of the ball image $I_{23}$. In other words, even if the first camera 1 and the second camera 2 are used, a trajectory from the point P1 to the point P3 cannot be measured.

Figure 5:
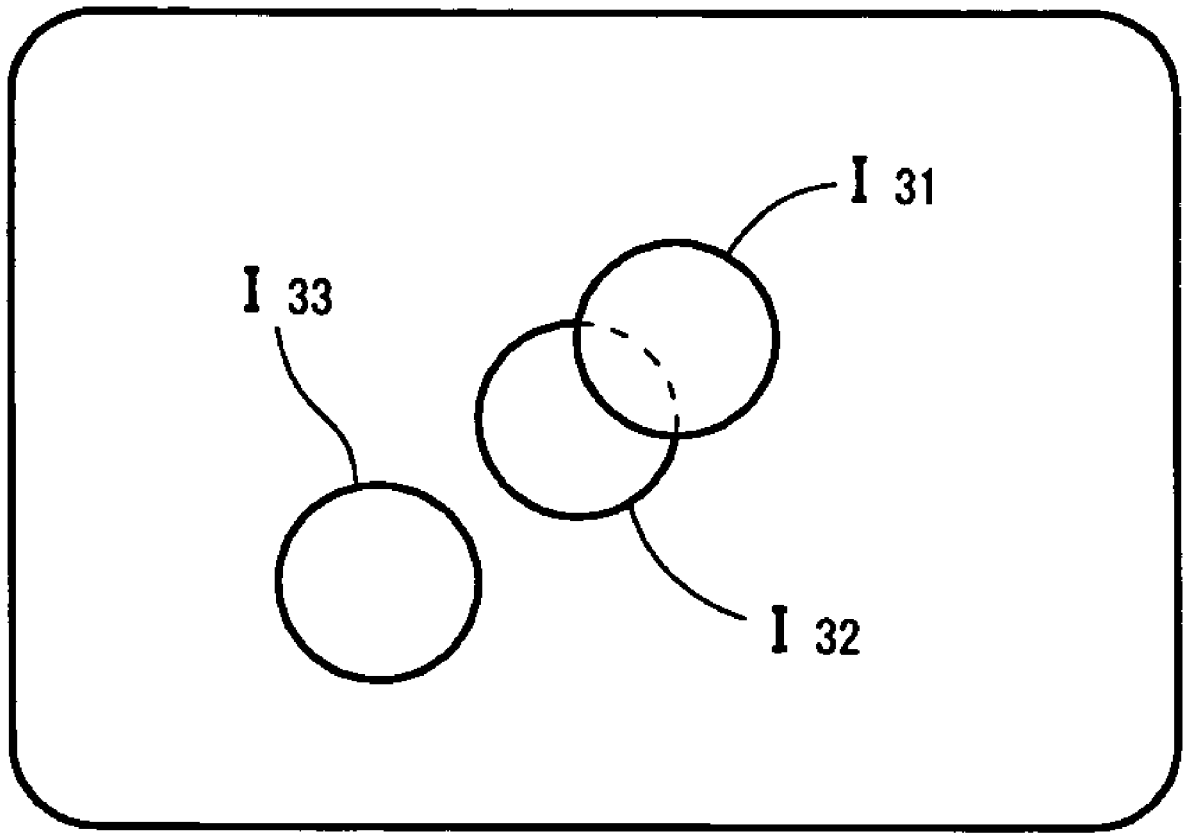
FIG. 5 is a typical view showing a state in which three frames obtained by a third camera are superposed.

FIG. 5 is a typical view showing a state in which the three frames obtained by the third camera 3 are superposed. FIG. 5 shows a ball image $I_{31}$ on the point P1, a ball image $I_{32}$ on the point P2, and a ball image $I_{33}$ on the point P3. The third camera 3 is provided apart from a segment connecting the first camera 1 to the second camera 2. Therefore, the degree of the overlap of the ball image $I_{31}$ and the ball image $I_{32}$ is low. The difference peak hold processing can be carried out between the frame of the ball image $I_{31}$ and that of the ball image $I_{32}$. The third camera 3 is provided apart from the segment connecting the first camera 1 to the second camera 2. Therefore, the ball image $I_{32}$ does not overlap with the ball image $I_{33}$. The difference peak hold processing can be carried out between the frame of the ball image $I_{32}$ and that of the ball image $I_{33}$. In other words, the angles of elevation of the golf ball B on the points P1, P2 and P3 can be calculated based on the image obtained by the third camera 3. By using the first camera 1 and the third camera 3, it is possible to calculate the coordinates (x, z) of the golf ball B on the points P1, P2 and P3 by the triangulation method.

As is apparent from FIG. 3, the angle of view of the second camera 2 overlaps with that of the third camera 3. For a certain period of time of a flight, the ball images are simultaneously photographed by both the second camera 2 and the third camera 3. The second camera 2 and the third camera 3 are synchronized with each other. Based on imaged at a obtained by the simultaneous photographing operation, therefore, the angle of view of the second camera 2 can be related to that of the third camera 3. In other words, the correspondence of coordinates in the angle of view of the second camera 2 to coordinates in the angle of view of the third camera 3 is grasped by the calculating means. A relay from the photographing operation of the second camera 2 to that of the third camera 3 is carried out so that position coordinate data continuing over a wide range of the trajectory T can be measured with high precision. As described above, the angles of view are related based on the image data obtained by the simultaneous photographing operations. Even if precision in the installation of the optical axis of the camera is insufficient, therefore, the position coordinates (x, z) can be calculated with high precision.

It is preferable that a distance between the second camera 2 and the third camera 3 should be 3 to 30 m. If the distance is less than the range, precision in a measurement is insufficient. From this viewpoint, it is more preferable that the distance should be 5 m or more. If the distance exceeds the range, a large space is required for installing the third camera 3. From this viewpoint, it is more preferable that the distance should be 20 m or less and it is particularly preferable that the distance should be 15 m or less.

The third camera 3 may be provided above the second camera 2. The third camera 3 may be provided in a position on an X axis which is placed apart from a segment connecting the first camera 1 to the second camera 2.

In the methods shown in FIGS. 2 and 3, the measurement is carried out when the golf ball B flies without a substantially transverse shift from a target direction. In the case in which the flight is shifted in the target direction, a transverse direction (a vertical direction in FIG. 3) is set to be a Y axis. An angle of elevation of the golf ball B in the first camera 1 is represented by $\theta_{1Z}$, an angle of elevation of the golf ball B in the position of the second camera 2 is represented by $\theta_{2Z}$, an angle in a transverse direction of the golf ball B in the position of the first camera 1 is represented by $\theta_{1Y}$, and an angle in the transverse direction of the golf ball B in the position of the second camera 2 is represented by $\theta_{2Y}$. $\theta_{1Z}$, $\theta_{2Z}$, $\theta_{1Y}$ and $\theta_{2Y}$ are obtained by an image processing based on the image data. Position coordinates (x, y, z) of the golf ball B are obtained by substituting $\theta_{1Z}$, $\theta_{2Z}$, $\theta_{1Y}$ and $\theta_{2Y}$ for the following equations (5), (6) and (7).

$$y = (L \cdot \tan\theta_{1Y} \cdot \tan\theta_{2Y}) / (\tan\theta_{1Y} + \tan\theta_{2Y}) \quad (5)$$

$$O = ((\tan\theta_{1Z})^2 + (\tan\theta_{2Z})^2) \cdot x^2 + 2 \cdot (\tan\theta_{2Z})^2 \cdot L \cdot x + ((\tan\theta_{1Z})^2 - (\tan\theta_{2Z})^2) \cdot y^2 - (\tan\theta_{2Z})^2 \cdot L^2 \quad (6)$$

$$O = (\tan\theta_{1Z})^2 \cdot (x^2 + y^2) - z^2 \quad (7)$$

Also in this case, the photographing operation is relayed by the second camera 2 and the third camera 3 of which angles of view are related to each other. Consequently, it is possible to carry out the measurement over a wide range of the trajectory T.

At least three cameras for photographing the golf ball B from ahead may be provided and the photographing operation may be relayed by these cameras. At least two cameras for photographing the ball B from behind may be provided and the photographing operation may be relayed by these cameras.

Figure 6:
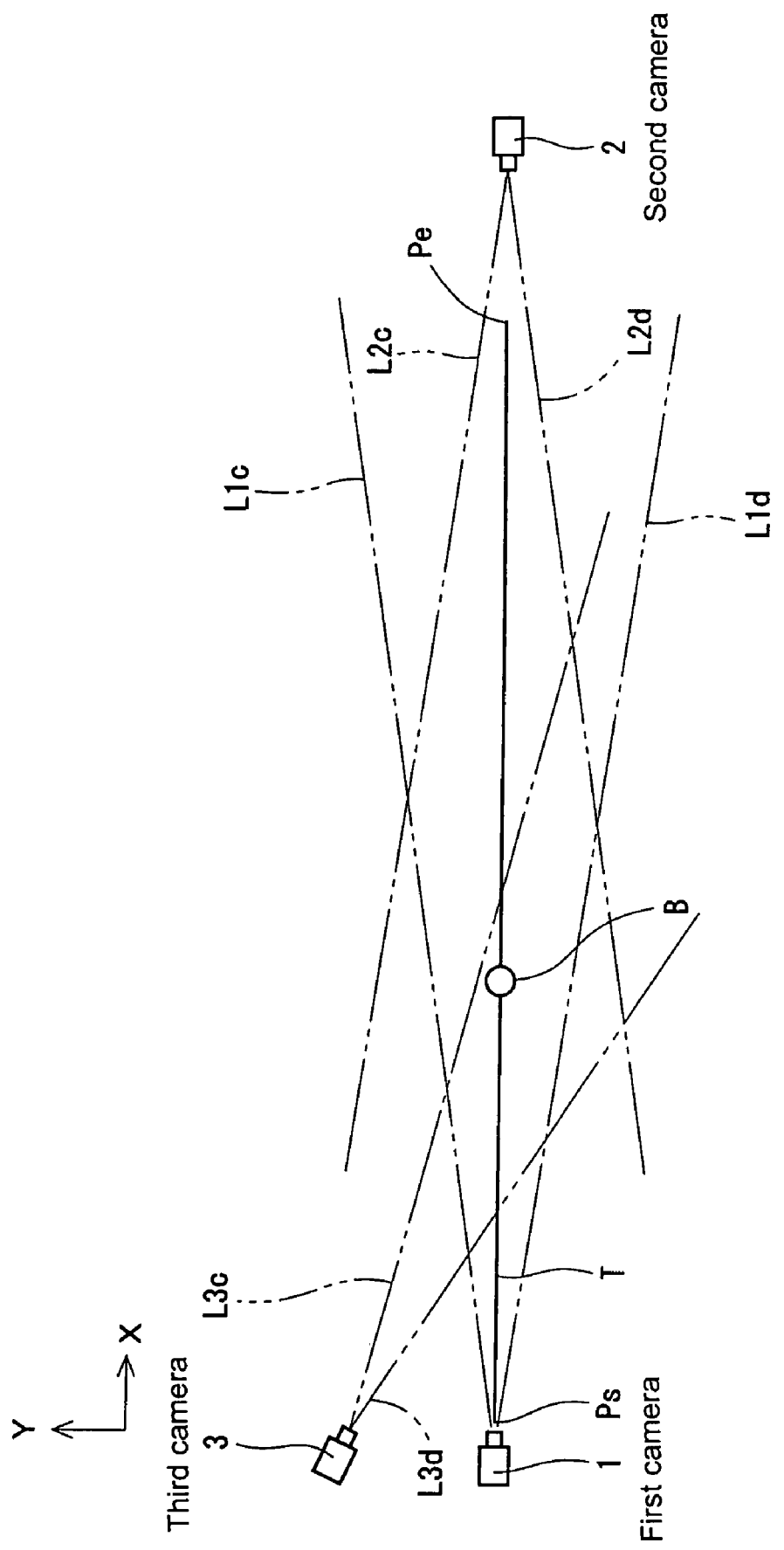
FIG. 6 is a typical plan view showing another measuring method using the apparatus of FIG. 1.

FIG. 6 is a typical plan view showing another measuring method using the apparatus of FIG. 1. In this example, the positions of the first camera 1 and the second camera 2 are equivalent to those of FIG. 3. The third camera 3 is positioned apart from a segment connecting the first camera 1 to the second camera 2. The third camera 3 is close to the launch point Ps. The optical axis of the third camera 3 is inclined to the X axis. The third camera 3 photographs the golf ball B obliquely from behind. The angle of view of the first camera 1 is related to that of the third camera 3.

In this measuring method, the golf ball B is first photographed by the third camera 3 and the second camera 2. The photographing operation of the third camera 3 is relayed to the first camera 1. Then, the golf ball B is photographed by the first camera 1 and the second camera 2. Based on image data thus obtained, the coordinate positions (x, z) or (x, y, z) of the golf ball B are calculated by the triangulation method. In this example, the third camera 3 is provided apart from the segment connecting the first camera 1 to the second camera 2. Therefore, a range in which the direction of the movement of the golf ball B is almost coincident with the optical axis of the first camera 1 can be photographed by means of the third camera 3.

It is preferable that a distance between the first camera 1 and the third camera 3 should be 3 to 30 m. If the distance is less than the range, precision in a measurement is insufficient. From this viewpoint, it is more preferable that the distance should be 5 m or more. If the distance exceeds the range, a large space is required for installing the third camera 3. From this viewpoint, it is more preferable that the distance should be 20 m or less and it is particularly preferable that the distance should be 15 m or less.

The third camera 3 may be provided above the first camera 1. The third camera 3 may be provided in a position on the X axis which is placed apart from the segment connecting the first camera 1 to the second camera 2.

The measuring apparatus according to the present invention can be applied to the measurement of the trajectories of various balls such as a tennis ball and a baseball.

The above description is only illustrative and various changes can be made without departing from the scope of the present invention.

What is claimed is:

1. A ball trajectory measuring apparatus, comprising:
a first camera for photographing a back of a flying ball;
a second camera for photographing a front of the flying ball;

a third camera which is present in a position placed apart from a segment connecting the first camera to the second camera; and a calculating portion for calculating time series data on position coordinates of the ball based on a comparison between an image obtained by the first camera and an image obtained by the second camera and a comparison between the image obtained by the first camera and an image obtained by the third camera;

wherein a part of an angle of view of the first camera or the second camera and a part of an angle of view of the third camera overlap with each other and the angle of view of the third camera is related to the angle of view of the first camera or the second camera based on a ball image obtained by the first camera or the second camera and a ball image obtained by the third camera, and wherein the third camera is located after the drop point of the flying golf ball at a position offset from the second camera.

2. The ball trajectory measuring apparatus according to claim 1, wherein the first camera is located behind a launch point of the flying golf ball and the second camera is located after a drop point of the flying golf ball.

3. The ball trajectory measuring apparatus according to claim 1, wherein an optical axis of the first camera and an optical axis of the second camera are generally co-planar and an optical axis of the third camera is not co-planar with the optical axes of the first and second cameras.

4. A ball trajectory measuring apparatus comprising:
a first camera for photographing a back of a flying ball;
a second camera for photographing a front of the flying ball;
a third camera which is present in a position placed apart from a segment connecting the first camera to the second camera; and
a calculating portion for calculating time series data on position coordinates of the ball based on a comparison between an image obtained by the first camera and an image obtained by the second camera and a comparison between an image obtained by the third camera and the image obtained by the second camera;
wherein a part of an angle of view of the first camera or the second camera and a part of an angle of view of the third camera overlap with each other and the angle of view of the third camera is related to the angle of view of the first camera or the second camera based on a ball image obtained by the first camera or the second camera and a ball image obtained by the third camera, and
wherein the third camera is located behind the launch point of the flying golf ball at a position offset from the first camera.

5. The ball trajectory measuring apparatus according to claim 4, wherein the first camera is located behind a launch point of the flying golf ball and the second camera is located after a drop point of the flying golf ball.

6. The ball trajectory measuring apparatus according to claim 4, wherein an optical axis of the first camera and an optical axis of the second camera are generally co-planar and an optical axis of the third camera is not co-planar with the optical axes of the first and second cameras.

7. A ball trajectory measuring apparatus, comprising:
a first camera for photographing a back of a flying ball, said first camera being located behind a launch point of the flying ball;
a second camera for photographing a front of the flying ball, said second camera being located after a drop point of the flying ball;
a third camera, said third camera being located adjacent to said first camera or said second camera and being laterally offset from a segment connecting the first camera to the second camera; and
a calculating portion for calculating time series data on position coordinates of the ball based on a comparison between an image obtained by the first camera and an image obtained by the second camera and a comparison between the image obtained by the first camera or the second camera and an image obtained by the third camera;
wherein a part of an angle of view of the first camera or the second camera and a part of an angle of view of the third camera overlap with each other and the angle of view of the third camera is related to the angle of view of the first camera or the second camera based on a ball image obtained by the first camera or the second camera and a ball image obtained by the third camera, and
wherein the third camera is located after the drop point of the flying golf ball at a position offset from the second camera or third camera is located before the launch point of the flying golf ball at a position offset from the first camera.

8. The ball trajectory measuring apparatus according to claim 7, wherein an optical axis of the first camera and an optical axis of the second camera are generally co-planar and an optical axis of the third camera is not co-planar with the optical axes of the first and second cameras.

* * * * *